United States Patent [19]

Schultz

[11] Patent Number: 4,490,911
[45] Date of Patent: Jan. 1, 1985

[54] SHOE DEWEEDER

[76] Inventor: Charles J. Schultz, 5860 Middle Fork Dr., Sparks, Nev. 89431

[21] Appl. No.: 439,844

[22] Filed: Jan. 17, 1983

[51] Int. Cl.³ .................. B26B 19/04; A01B 39/00; A01B 49/02
[52] U.S. Cl. .................. 30/297; 172/192; 172/199
[58] Field of Search .............. 30/297; 172/192, 199; 56/303

[56] References Cited

U.S. PATENT DOCUMENTS

| 110,014 | 12/1870 | Corbett | 30/297 |
| 173,435 | 2/1876 | Ball et al. | 30/297 |
| 391,738 | 10/1888 | Cross | 30/297 |
| 664,627 | 12/1900 | Eberlein | 30/297 |
| 897,901 | 9/1908 | Huffaker | 30/297 |
| 1,164,810 | 12/1915 | Hammond | 30/297 |

FOREIGN PATENT DOCUMENTS 492849 12/1919 France ................ 30/297

Primary Examiner—Paul A. Bell
Assistant Examiner—Paul M. Heyrana, Sr.

[57] ABSTRACT

A weed cutting device having a double edged, rectangular, shaped blade that is attached to and in front of a toe boot that fits over a user's shoe.

1 Claim, 5 Drawing Figures

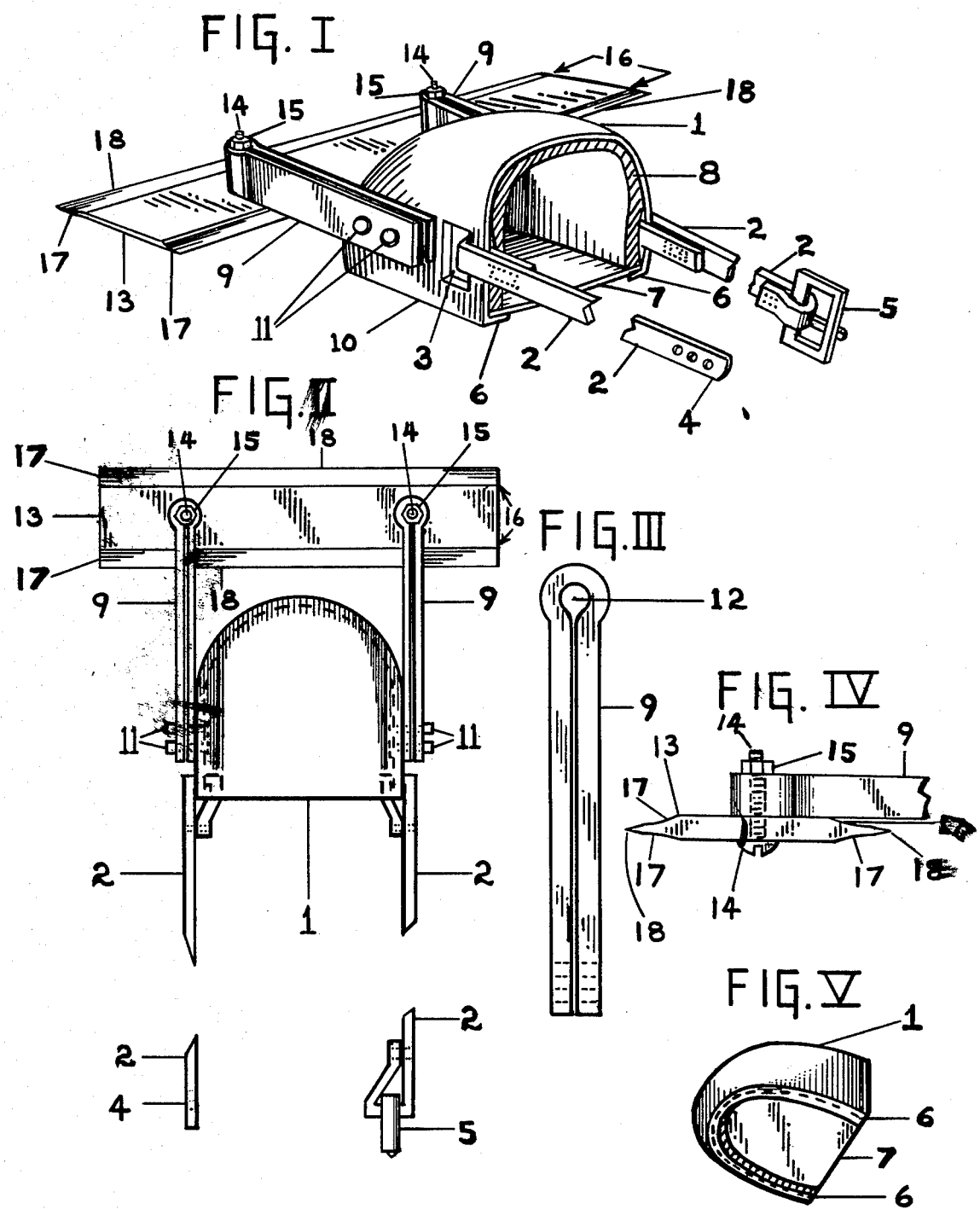

SHOE DEWEEDER

My invention to that class of agricultural implements which are called hoes and is designed specifically for deweeding, although, it does also cultivate.

Of the hoes in use, the majority have one long handle, with a scuffling device or chopping device at the working end. With these type hoes, one must hold the handle with the hands and push or pull the hoe, or chop with it. In use then, the hoe handle is held to the left or right of the user's body. In that position, the hips and upper body must turn and twist continually, which frequently starts a chain reaction of physiological events, beginning with a primary curve in the spinal column, followed by compensatory curves either above and/or below the primary curve, then muscle spasms at one or more places along the spinal column which in turn cause rotated and deviated vertebrae.

A spinal column out of alignment, as described, can cause considerable discomfort and pain, which can last for days.

Further, using the arms and body in hoeing, becomes very tiring and enervating, while the hands become roughened and blistered, with associated pain.

Accordingly, an object of my invention is to provide another method of weeding in order to eliminate the turning and twisting of the hips and upper body, necessary with handled hoes, which said movement frequently causes a misaligned spinal column, muscle spasms, and pain.

Another object of my invention is to make deweeding less tiring, by using the kinetic energy of the natural movements of the human body.

Still another object of my invention is to make unnecessary the use of hands in deweeding, thus freeing the hands to do other things.

Further, another object of my invention is to make deweeding possible and easy in places where scuffle type hoes are of little value, such as dry areas along roads where the ground is very rocky and hard, which prevents scuffle type hoes from penetrating the surface sufficiently and smoothly.

Still further, another object of my invention is to provide a cutting blade that is easily attached and detached, and is so designed as to provide an additional cutting edge, thereby, extending the life of the blade.

These stated objects, along with other objects, will become fully apparent and shown to be fully accomplished upon reference to the following description and the drawing, which is a part of this specification.

In said stated drawing;

FIG. I is a perspective view of a shoe hoe, embodying the features of my invention.

FIG. II is a plan view in elevation of FIG. I.

FIG. III is an enlarged view of one arm taken from FIG. II.

FIG. IV is an enlarged, fragmentary view, in side elevation, showing the blade shape and its attachment to one arm.

FIG. V is a view of toe boot, showing the sole plate on the bottom of toe boot.

Referring more particularly to the drawing through the use of reference characters placed thereon;

Number 1 is a toe boot which is placed over the toe of a shoe. The toe boot, 1, is set onto the shoe and held securely in place by straps, 2, that are attached in slots, 3, one on each side, and to the rear of the toe boot, 1. Said straps, 2, are then drawn rearwardly, and thensecurely fastened behind the shoe by belt, 4, and buckle, 5, or any of the commonly known and suitable fastening devices.

The straps, 2, can be constructed of any suitable material, and of such size and dimensions, known to those skilled in the art, that will hold the toe boot, 1, securely to the wearer's shoe.

The toe boot, 1, is made of metal, preferably steel. The gauge of the toe boot metal is number 10, however, the gauge is not held strictly to that weight, and it is stated that any slight variation in gauge, within normal limits, is acceptable.

Of the various methods of manufacturing, die cast, mold casted, it has been found that the most economical method of manufacturing the toe boot, is to have it constructed in two parts. The top part, with flange, 6, to be stamped; and the bottom part or sole plate, 7, to be welded to flange, 6,. The sole plate, 7, is welded inside the upper part of toe boot, so that when using the shoe deweeder, on a forward motion, the weld of the sole plate, and its seam, will not run into the ground, thereby, avoiding damage to the weld, also, thereby, reducing resistance. The accomplished purpose of the sole plate, 7, is to make a solidly constructed toe boot, 1, and to protect from wear, the sole of the user's shoe. The toe boot, 1, is manufactured in general sizes, medium, large, and extra large.

Inside the toe boot, 1, is a one piece, thick, durable, cushioning pad, 8, approximately three eighths of an inch thick, that covers both sides, and inside upper part of toe boot, 1.

The purpose of the pad, 8, is to protect the wearer's shoe, absorb energy when the shoe deweeder is used, and to act as a spacer, so that one toe boot, 1, will fit either a left or right shoe, since the shape of the front of the toe boot, 1, is full round. The pad, 8, can be made of any of the commonly known materials that can accomplish the purposes of the pad, 8.

Attached to each side of the toe boot, 1, is an arm, 9. The arms, 9, are located forward of the slots, 3, and in line with the straps, 2. Further, the said arms, 9, are parallel to the bottom 10, of the toe boot, 1 and are approximately five eighths of an inch above the bottom of the sides of the toe boot, 1.

Each arm, 9, is attached to the toe boot, 1, by two rivets, 11, said rivets then welded to inside of toe boot, 1. The two rivets, 11, of each arm, 9, are set in tandem, longitudinally, so as to prevent the arms, 9, from pivoting upwardly or downwardly.

FIG. III is an enlarged view of one arm, 9, taken from FIG. II, and shows arm construction. The arm, 9, is shown to be made of one continuous piece of metal, preferably steel, approximately one sixteenth of an inch thick, and approximately five eighths of an inch wide.

The metal strip is bent at its very center, so as to form an aperture, 12, following which the metal is crimped which completes the aperture, 12, and brings together the remaining lengths of the metal strip. Thence, the two lengths are brought together and welded continuously to their very ends, so as to form the complete arm, 9.

At the rear of each arm, 9, which is that end directly opposite the aperture, 12, two holes, approximately three sixteenths of an inch in diameter, are centrally drilled, transversely through the arm, 9, for the placement of two rivets, 11. The center of the rearmost rivet hole is approximately one half inch from the end of the arm, 9, with the forward most rivet hole, being conveniently close to the rearmost rivet hole.

The two parallel arms, 9, are projected forwardly of the toe boot, 1, where the cutting blade, 13, is attached to the arms, 9, by machine screws, 14, which are inserted upwardly from the bottom of the cutting blade, 13, through holes provided; thence, through the apertures, 12, of the arms, 9, where said screws are secured by accommodating nuts, 15.

The diameter of the holes in the cutting blade, 13, are quite equivalent to the size of the apertures, 12, of the arms, 9,; said apertures not being true circles, but rather tear drop in shape, a stated diameter would therefore, lack certainty. The diameter of the cutting blade holes is approximately three sixteenths of an inch.

The diameter of the machine screws, 14, is of such size, that it will enable machine screws, 14, to fit snugly inside both cutting blade holes and arm apertures, 12. The length of the machine screws, 14, is such that it will enable said screws to fasten cutting blade, 13, to arms, 9, and with sufficiency to be secured by accommodating nuts, 15. The total length of the machine screws, is approximately one and one quarter inch.

The length of the arms, 9, is such that when the cutting blade, 13, is attached to the arms, 9, the distance between the very front most part of the toe boot, 1, and the rear edge of the cutting blade, 13, is approximately one inch.

This one inch space is required in order to allow soil to pass over the cutting blade and return to the ground, when this invention is used. This movement of soil is the cultivating action of my invention.

A cross section of the cutting blade, 13, FIG. IV, shows the blade to have a flat center section, 16, with two outwardly disposed areas, 17; said outwardly disposed areas being concavo-concave in shape, which said shape makes possible the sharpening of the blade when in use.

The cutting blade, 13, is made of steel, preferably stainless steel, has substantial length, approximately five and one half inches long, and at its thickest place, which is the center section, 16, the said blade is approximately one eighth of an inch thick.

The outwardly disposed areas, 17, which, in concavo-concave fashion, taper down to the cutting edges, 18, have a length of approximately five sixteenths of an inch.

In FIG. II and FIG. IV, it is clearly seen that the holes in the cutting blade, 13, are equidistantly spaced between the cutting edges, 18, of cutting blade, 13, thus allowing the cutting blade to be both rotatable and reversible; that is, the rear cutting edge becoming the front cutting edge, and the bottom of the cutting blade, becoming the top of the cutting blade.

The corners of the cutting blade, being square, allow for deweeding along fences, curbs, and close to the base of plants.

MODE OF OPERATION

In walking, there are two generally accepted styles; knee stepping and striding.

In knee stepping, a knee is lifted which raises the heel and leaves the toe pointing downwardly. The weight of the body is then shifted forwardly and the leg, which is that part of the limb, from the knee down, is allowed to swing forwardly of its own weight in pendulum fashion, with very little expenditure of energy.

This forward swinging motion of the leg is the kinetic energy of the body, limb movement. It is this kinetic energy that is utilized in using my invention.

Knee stepping requires very little energy use, the legs being used like forwardly swinging weights, and because of this low energy expenditure, knee stepping is the style of walking preferred by gentlemen of the road.

The other style of walking is striding. In walking using the striding method, bending of the limb at the knee is undesirable. It is seen that, after an initial step, one limb is to the rear of the body. Then, from this position, utilizing the muscles of the thigh, which is that part of the limb from the knee to the hip, and the weight of the limb, the entire limb is swung forwardly, from the hip; the leg more or less going along for the ride.

This is the style of walking used by persons walking with artificial limbs. The key to striding is the position of the upper body, which should be straight, that is perpendicular.

Striding generates much more kinetic energy, and this style of walking is also utilized in using my invention. When weeds are thick and heavy, this style of limb movement is used, because of the large amount of kinetic energy available.

My invention then, using both styles of walking, requires less energy in use, and eliminates the use of the hands and arms, and reduces the use of the muscles of the back, while at the same time, eliminating the twisting and turning of the upper body that is necessary with handled hoes.

In operation then, using a walking style, the cutting blade of the shoe deweeder is aimed downwardly at a point just below the base of the weed, or in rocky, hard ground, directly at the visual base of the weed, and by using some muscle energy plus the kinetic energy of the body, limb movement, the weed is cut with ease.

From the foregoing, it is thought that the construction, operation, and many advantages of the herein described invention, without further description, will be apparent to those skilled in the art, and it will be readily apparent, that changes in the size, shape, and minor details may be resorted to without departing from the spirit of the invention.

Having thus described my invention, what I claim as new, and desire to secure by Letters Patent is:

1. A deweeding implement that utilizes muscle and kinetic energy of the movement of the low limbs of the human body; that comprises a toe boot, having two laterally fastened, parallel arms, each arm fastened by two welded rivets which are in tandem, longitudinally, said arms projected forwardly to a point where a double edged cutting blade is attached, in front of, and across the toe boot, with machine screws, upwardly inserted from the bottom of the cutting blade, through holes provided, thence through apertures of the arms, thereupon, said screws are secured by accommodating nuts; the cutting blade then so secured and placed as to leave a space of one inch from front of toe boot to edge of cutting blade, nearest the front of the toe boot, said cutting blade being rectangular in shape, having two cutting edges, one edge being one of the longer sides of the rectangle, with the second cutting edge being the other longer side of the rectangle, said cutting blade being concavo-concave in shape on its outwardly disposed areas of the two longer sides of its rectangle shape, which said convaco-concave shape allows for self sharpening of cutting blade, while implement is in use; said cutting blade being so designed as to utilize both cutting edges of said blade, by the detachability, reversibility, rotatability of the blade; and with toe boot, arms, blade assembly, all secured to user's shoe by straps drawn rearwardly from point of securement on toe boot, said point of securement being slots on each side of rear of toe boot, said straps then brought to a place behind the user's shoe, where said straps are drawn together and secured by a buckling device, with then toe boot, arms, blade assembly secured and comfortably fit, assisted by a heavy cushion pad, inside toe boot, which said pad, acting as a protective cushion, also acts as a spacer, making this invention adaptable to either a left or right shoe.

* * * * *